(12) United States Patent
Yan et al.

(10) Patent No.: US 12,309,626 B2
(45) Date of Patent: May 20, 2025

(54) INFORMATION REPORTING METHOD, INFORMATION ACQUISITION METHOD, TERMINAL, AND NETWORK DEVICE

(71) Applicant: DATANG MOBILE COMMUNICATIONS EQUIPMENT CO., LTD., Beijing (CN)

(72) Inventors: Nan Yan, Beijing (CN); Jing Liang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 500 days.

(21) Appl. No.: 17/275,878

(22) PCT Filed: Aug. 9, 2019

(86) PCT No.: PCT/CN2019/099918
§ 371 (c)(1),
(2) Date: Mar. 12, 2021

(87) PCT Pub. No.: WO2020/052389
PCT Pub. Date: Mar. 19, 2020

(65) Prior Publication Data
US 2021/0289381 A1   Sep. 16, 2021

(30) Foreign Application Priority Data
Sep. 14, 2018 (CN) .......................... 201811076754.X (51) Int. Cl.
*H04W 24/10* (2009.01)
*H04W 72/044* (2023.01)
(Continued)

(52) U.S. Cl.
CPC ......... *H04W 24/10* (2013.01); *H04W 72/046* (2013.01); *H04W 74/0833* (2013.01); *H04W 76/18* (2018.02)

(58) Field of Classification Search
CPC .............. H04W 24/10; H04W 72/046; H04W 74/0833; H04W 76/18; H04W 74/004;
(Continued)

(56) References Cited

U.S. PATENT DOCUMENTS

| 2010/0118743 A1* | 5/2010 | Suo | .......................... H04L 5/005 370/329 |
| 2010/0246456 A1* | 9/2010 | Suo | ....................... H04B 7/2656 370/336 |

(Continued)

FOREIGN PATENT DOCUMENTS

| CN | 101801045 A | * | 8/2010 | ........ H04W 36/0066 |
| CN | 102843706 A | | 12/2012 | |

(Continued)

OTHER PUBLICATIONS

Qualcomm Incorporated, "Remaining issues on beam selection for handover access", Agenda item 10.4.1.5.1, 3GPP TSG-RAN WG2 Meeting #99bis, R2-1711365, Oct. 9-13, 2017, Prague, Czech.

(Continued)

*Primary Examiner* — Khaled M Kassim
*Assistant Examiner* — Oladiran Gideon Olaleye
(74) *Attorney, Agent, or Firm* — Harness, Dickey & Pierce, P.L.C.

(57) ABSTRACT

An information reporting method, an information obtaining method, a terminal and a network device are provided. The information reporting method, applied to a terminal, includes: obtaining an execution result of the terminal for a target procedure; and sending report information corresponding to the execution result to a network device; the target procedure is a connection establishment procedure, a connection resume procedure, or a system information request procedure; the report information includes at least one of: type information of the target procedure, beam
(Continued)

related information, resource related information, cell related information, location information of the terminal, or time related information; the execution result is access success or access failure.

19 Claims, 3 Drawing Sheets

(51) Int. Cl.
*H04W 74/0833* (2024.01)
*H04W 76/18* (2018.01)

(58) Field of Classification Search
CPC ........... H04W 74/006; H04W 74/0891; H04W 76/10; H04W 76/19; H04W 16/28; H04W 74/002; H04B 7/063; H04B 7/0695
USPC ......................................................... 370/252
See application file for complete search history.

(56) References Cited

U.S. PATENT DOCUMENTS

| | | | | |
|---|---|---|---|---|
| 2014/0010178 A1* | 1/2014 | Yu | ....................... | H04B 7/0695 370/329 |
| 2014/0023032 A1 | 1/2014 | Kim et al. | | |
| 2014/0376466 A1* | 12/2014 | Jeong | ................ | H04W 74/0833 370/329 |
| 2015/0119048 A1* | 4/2015 | Yang | ..................... | H04W 76/15 455/444 |
| 2015/0195800 A1 | 7/2015 | Zhu et al. | | |
| 2015/0319659 A1* | 11/2015 | Jung | ..................... | H04W 72/52 370/331 |
| 2017/0208488 A1 | 7/2017 | Hwang et al. | | |
| 2017/0311290 A1* | 10/2017 | Adjakple | .............. | H04W 76/18 |
| 2018/0041857 A1* | 2/2018 | Ouchi | .................... | H04W 72/12 |
| 2019/0326976 A1 | 10/2019 | Hu et al. | | |
| 2019/0335392 A1* | 10/2019 | Qiao | ..................... | H04W 48/16 |
| 2019/0380128 A1* | 12/2019 | Park | ...................... | H04W 88/10 |
| 2020/0154513 A1* | 5/2020 | Zhang | ................... | H04W 80/02 |
| 2021/0007132 A1 | 1/2021 | Jiang | | |

FOREIGN PATENT DOCUMENTS

| | | | | |
|---|---|---|---|---|
| CN | 105722213 A | * | 6/2016 | |
| CN | 107872815 A | | 4/2018 | |
| CN | 108243508 A | | 7/2018 | |
| CN | 108282869 A | * | 7/2018 | .......... H04B 7/0695 |
| CN | 108496385 A | | 9/2018 | |
| EP | 3 249 831 A1 | | 11/2017 | |
| KR | 20120115953 A | | 10/2012 | |
| KR | 20170087054 A | | 7/2017 | |
| WO | WO-2018/058583 A1 | | 4/2018 | |
| WO | WO-2018059579 A1 | * | 4/2018 | ............ H04W 48/08 |

OTHER PUBLICATIONS

Chinese Office Action dated Dec. 6, 2021 for CN 201811076754.X.
Extended European Search Report dated Oct. 29, 2021 for EP Application No. 19 86 1031.
Korean Office Action dated Oct. 13, 2022 for KR 10-2021-70111050.
LG Electronics, "Downlink channel quality report during random access procedure on a non-anchor carrier", Agenda 6.2.2.5, 3GPP TSG RAN WG1 Meeting #94, R1-1808478, Gothenburg, Sweden, Aug. 20-24, 2018.
Written Opinion and International Search Report dated Mar. 9, 2021 for International Application No. PCT/CN2019/099918.

* cited by examiner

INFORMATION REPORTING METHOD, INFORMATION ACQUISITION METHOD, TERMINAL, AND NETWORK DEVICE

CROSS-REFERENCE TO RELATED APPLICATIONS

This application is the U.S. national phase of PCT Application No. PCT/CN2019/099918 filed on Aug. 9, 2019, which claims a priority to Chinese Patent Application No. 201811076754.X filed on Sep. 14, 2018, the disclosures of which are incorporated in their entirety by reference herein.

TECHNICAL FIELD

The present disclosure relates to the field of communication technology, and in particular to an information reporting method, an information obtaining method, a terminal, and a network device.

BACKGROUND

In the long term evolution (Long Term Evolution, LTE), a user equipment (User Equipment, UE) may record and report, for a successful procedure of random access (Random Access, RA), the quantity of transmissions of a preamble and whether it is a contention-free random access (Contention-Free Random Access, CFRA)/contention based random access (Contention Based Random Access, CBRA).

In the 5G and subsequent versions, due to changes in the architecture and changes in the method/content of measurement/configuration, the content recorded and reported in a case of RACH failure/success in the related RRC access procedure does not meet requirements of the 5G and subsequent communication systems.

SUMMARY

Embodiments of the present disclosure provide an information reporting method, an information obtaining method, a terminal and a network device, to solve the problem that the content recorded and reported in a case of RACH failure/success in the related RRC access procedure does not meet requirements of the 5G and subsequent communication systems and communication reliability of the 5G and subsequent communication systems cannot be ensured.

In order to solve the above technical problem, embodiments of the present disclosure provide an information reporting method, which is applied to a terminal and includes:

obtaining an execution result of the terminal for a target procedure; and sending report information corresponding to the execution result to a network device;

where the target procedure is a connection establishment procedure, a connection resume procedure, or a system information request procedure;

the report information includes at least one of: type information of the target procedure, beam related information, resource related information, cell related information, location information of the terminal, or time related information;

the execution result is access success or access failure.

Specifically, the beam related information includes at least one of:

first beam information, or, measurement information of a beam of a first cell;

where the first cell includes: a cell where the terminal initiates a random access.

Further, the first cell further includes: a neighboring cell of the cell where the terminal initiates the random access.

Further, in a case that the execution result is the access failure, the first beam information is beam information used when the terminal fails; and in a case that the execution result is the access success, the first beam information is beam information used when the terminal successfully accesses.

Specifically, the resource related information includes at least one of:

a preamble and random access channel (RACH) resource information that are used by the terminal;

carrier information used by the terminal;

the quantity of transmissions of a preamble;

indication information of whether a maximum transmission power of a preamble is reached; or, a correspondence between RACH resource information and synchronization signal block (SSB).

Specifically, the cell related information includes at least one of:

a registered public land mobile network of the terminal; or, measurement result information of the terminal in a first state, where the measurement result information is about a cell on which the terminal currently camps and a neighboring cell of the cell on which the terminal currently camps;

where the first state includes: an idle state and/or an inactive state.

Further, in a case that the execution result is the access failure, the measurement result information is measurement result information of the terminal in the first state before the access failure, about the cell on which the terminal currently camps and the neighbouring cell of the cell on which the terminal currently camps.

Specifically, in a case that the execution result is the access failure, the cell related information includes: identification information of a cell where the access failure occurs.

Specifically, in a case that the execution result is the access success, the cell related information includes: identification information of a cell where successful access of the terminal occurs.

Specifically, in a case that the execution result is the access failure, the time related information includes: a time interval between a time when the access failure occurs and a failure reporting time.

Specifically, in a case that the target procedure is the system information request procedure, the report information further includes at least one of:

random access type information, or, acquisition latency information of system information.

Embodiment of the present disclosure also provide an information obtaining method, which is applied to a network device and includes:

receiving report information sent by a terminal;

where the report information corresponds to an execution result of the terminal for a target procedure;

the target procedure is a connection establishment procedure, a connection resume procedure, or a system information request procedure;

the report information includes at least one of: type information of the target procedure, beam related information, resource related information, cell related information, location information of the terminal, or time related information;

the execution result is access success or access failure.

Specifically, the beam related information includes at least one of:
- first beam information, or,
- measurement information of a beam of a first cell;
- the first cell includes: a cell where the terminal initiates a random access.

Further, the first cell further includes: a neighboring cell of the cell where the terminal initiates the random access.

Further, in a case that the execution result is the access failure, the first beam information is beam information used when the terminal fails; and in a case that the execution result is the access success, the first beam information is beam information used when the terminal successfully accesses.

Specifically, the resource related information includes at least one of:
- a preamble and random access channel (RACH) resource information that are used by the terminal;
- carrier information used by the terminal;
- the quantity of transmissions of a preamble;
- indication information of whether a maximum transmission power of a preamble is reached; or,
- a correspondence between RACH resource information and synchronization signal block (SSB).

Specifically, the cell related information includes at least one of:
- a registered public land mobile network of the terminal; or,
- measurement result information of the terminal in a first state, where the measurement result information is about a cell on which the terminal currently camps and a neighboring cell of the cell on which the terminal currently camps;
- where the first state includes: an idle state and/or an inactive state.

Further, in a case that the execution result is the access failure, the measurement result information is measurement result information of the terminal in the first state before the access failure, about the cell on which the terminal currently camps and the neighbouring cell of the cell on which the terminal currently camps.

Specifically, in a case that the execution result is the access failure, the cell related information includes: identification information of a cell where the access failure occurs.

Specifically, in a case that the execution result is the access success, the cell related information includes: identification information of a cell where successful access of the terminal occurs.

Specifically, in a case that the execution result is the access failure, the time related information includes: a time interval between a time when the access failure occurs and a failure reporting time.

Specifically, in a case that the target procedure is the system information request procedure, the report information further includes at least one of:
- random access type information, or,
- acquisition latency information of system information.

Optionally, after the receiving the report information sent by the terminal, the method further includes:
- sending the report information to a data collection node.

Optionally, after the receiving the report information sent by the terminal, the method further includes:
- parsing a network node where an access problem of the terminal occurs, where the network node is indicated in the report information; and
- sending the report information to the network node.

Embodiments of the present disclosure also provide a terminal, including a memory, a processor, and a computer program stored on the memory and executable on the processor, where the processor implements the following steps when executing the computer program:
- obtaining an execution result of the terminal for a target procedure; and
- sending report information corresponding to the execution result to a network device;
- where the target procedure is a connection establishment procedure, a connection resume procedure, or a system information request procedure;
- the report information includes at least one of: type information of the target procedure, beam related information, resource related information, cell related information, location information of the terminal, or time related information;
- the execution result is access success or access failure.

Specifically, t the beam related information includes at least one of:
- first beam information, or,
- measurement information of a beam of a first cell.
- where the first cell includes: a cell where the terminal initiates a random access Further, the first cell further includes: a neighboring cell of the cell where the terminal initiates the random access.

Further, in a case that the execution result is the access failure, the first beam information is beam information used when the terminal fails; and in a case that the execution result is the access success, the first beam information is beam information used when the terminal successfully accesses.

the resource related information includes at least one of:
- a preamble and random access channel (RACH) resource information that are used by the terminal;
- carrier information used by the terminal;
- the quantity of transmissions of a preamble;
- indication information of whether a maximum transmission power of a preamble is reached; or,
- a correspondence between RACH resource information and synchronization signal block (SSB).

Specifically, the cell related information includes at least one of:
- a registered public land mobile network of the terminal; or,
- measurement result information of the terminal in a first state, where the measurement result information is about a cell on which the terminal currently camps and a neighboring cell of the cell on which the terminal currently camps;
- where the first state includes: an idle state and/or an inactive state.

Further, in a case that the execution result is the access failure, the measurement result information is measurement result information of the terminal in the first state before the access failure, about the cell on which the terminal currently camps and the neighbouring cell of the cell on which the terminal currently camps.

Specifically, in a case that the execution result is the access failure, the cell related information includes: identification information of a cell where the access failure occurs.

Specifically, in a case that the execution result is the access success, the cell related information includes: identification information of a cell where successful access of the terminal occurs.

Specifically, in a case that the execution result is the access failure, the time related information includes: a time interval between a time when the access failure occurs and a failure reporting time.

Specifically, in a case that the target procedure is the system information request procedure, the report information further includes at least one of:
- random access type information, or,
- acquisition latency information of system information.

Embodiments of the present disclosure also provide a network device, including a memory, a processor, and a computer program stored on the memory and executable on the processor, where the processor implements the following step when executing the computer program:
- receiving report information sent by a terminal;
- where the report information corresponds to an execution result of the terminal for a target procedure;
- the target procedure is a connection establishment procedure, a connection resume procedure, or a system information request procedure;
- the report information includes at least one of: type information of the target procedure, beam related information, resource related information, cell related information, location information of the terminal, or time related information;
- the execution result is access success or access failure.

Further, the processor implements the following step when executing the computer program:
- sending the report information to a data collection node.

Further, the processor implements the following steps when executing the computer program:
- parsing a network node where an access problem of the terminal occurs, where the network node is indicated in the report information; and
- sending the report information to the network node.

Embodiments of the present disclosure also provide a computer readable storage medium having a computer program stored thereon, where the computer program, when executed by a processor, implements the information reporting method or the information obtaining method as described above.

Embodiment of the present disclosure also provide a terminal, including:
- a obtaining module, configured to obtain an execution result of the terminal for a target procedure; and
- a first sending module, configured to send report information corresponding to the execution result to a network device;
- where the target procedure is a connection establishment procedure, a connection resume procedure, or a system information request procedure;
- the report information includes at least one of: type information of the target procedure, beam related information, resource related information, cell related information, location information of the terminal, or time related information;
- the execution result is access success or access failure.

Embodiment of the present disclosure also provide a network device, including:
- a first receiving module, configured to receive report information sent by a terminal;
- where the report information corresponds to an execution result of the terminal for a target procedure;
- the target procedure is a connection establishment procedure, a connection resume procedure, or a system information request procedure;
- the report information includes at least one of: type information of the target procedure, beam related information, resource related information, cell related information, location information of the terminal, or time related information;
- the execution result is access success or access failure.

The beneficial effects of the present disclosure are as follows.

In the above solutions, the report information is sent according to the execution result of the connection establishment procedure, the connection resume procedure or the system information request procedure, thereby improving the communication process of the 5G and subsequent communication systems and ensuring the reliability of network communication.

DETAILED DESCRIPTION

In order to clarify the objects, technical solutions, and advantages of the present disclosure, the present disclosure is described in detail hereinafter with reference to the accompanying drawings and specific embodiments.

The background technologies related to the present disclosure is introduced as follows.

For initial establishment failure of the LTE system, the recorded and reported content include:
- A1. A cell global identifier (Cell Global Identifier, CGI) of a cell where the failure occurs.
- A2. Location information (Location), including location coordinates (locationCoordinates) and a horizontal velocity (horizontalVelocity) (if available).
- A3. A measurement result of the failed cell, including reference signal received power (Reference Signal Receiving Power, RSRP) and reference signal received quality (Reference Signal Receiving Quality, RSRQ) (the value of RSRQ is related to the type).
- A4. A result of a measured neighbouring cell, including various RATs.
- A5. The quantity of transmissions of the preamble.
- A6. Being contention-free or contention based.
- A7. Whether a maximum transmission power is reached.

A8. A time interval between the occurrence of the failure and the reporting of the failure.

In the LTE, the reporting method for RACH failure of initial establishment includes: if the initial establishment failure occurs, relevant information is collected and put into a variable, and connEstFailInfoAvailable indication is notified to the network in an appropriate uplink message.

(1) Random Access Process

After the cell search process, the user equipment (User Equipment, UE, also referred to as a terminal) has achieved downlink synchronization with the cell, so the UE can receive downlink data. However, the UE can perform uplink transmission only if it has achieved uplink synchronization with the cell. The UE establishes a connection with the cell and obtains uplink synchronization through a random access procedure (Random Access Procedure).

There are 2 different ways of random access procedure.

Figure 1:
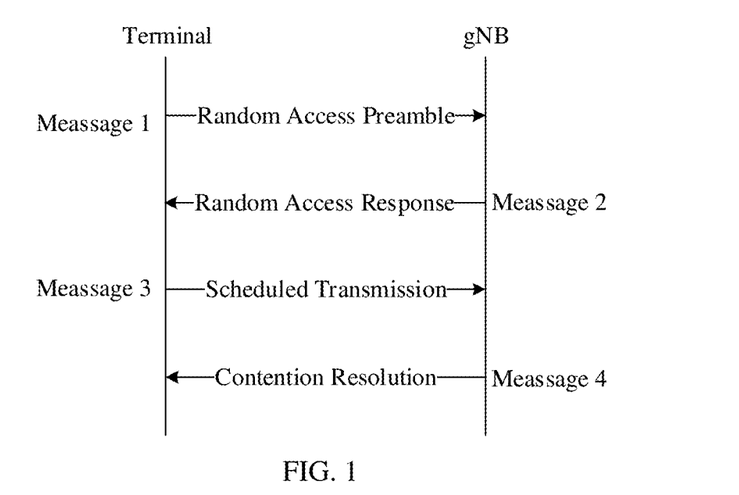
FIG. 1 is a schematic diagram of a flow of a contention based random access.

1. Contention based random access (Contention Based Random Access, CBRA). As shown in FIG. 1, the main process is as follows.

Message 1 (Msg1): the UE selects a random access preamble and a physical random access channel (Physical Random Access Channel, PRACH) resource, and uses the PRACH resource to send the selected random access preamble to the base station.

Message 2 (Msg2): random access response (Random Access Response, RAR) message. Random access response monitoring: the UE monitors the physical downlink control channel (Physical Downlink Control CHannel, PDCCH) in the window to receive the corresponding random access response.

Message 3 (Msg3): the UE sends uplink transmission on the uplink grant (UL grant) specified by the Msg2. There may be different signaling content for different scenarios, such as radio resource control (RRC) re-establishment request/RRC establishment request/system information request, etc.

Message 4 (Msg4): contention resolution message. The UE may determine, according to the Msg4, whether the random access is successful.

Figure 2:
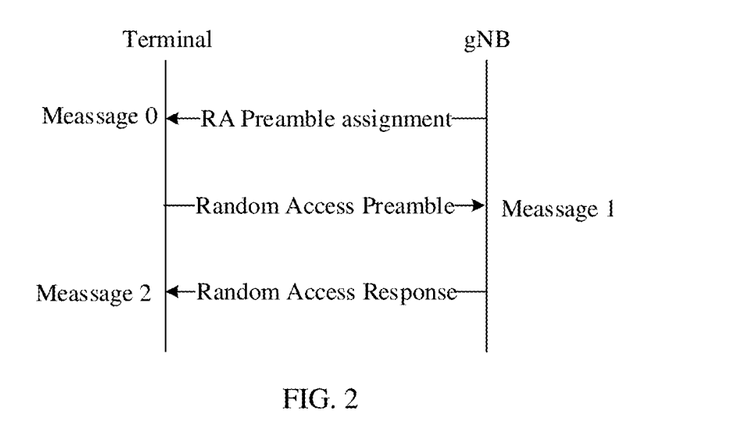
FIG. 2 is a schematic diagram of a flow of a contention-free random access.

2. Contention-free random access (Contention-Free Random Access, CFRA). As shown in FIG. 2, the main process is as follows.

Msg0: dedicated preamble and dedicated resource allocation for random access (RRC reconfiguration message).

Msg1: the UE selects the appropriate random access preamble and PRACH resource, according to its measurement result (Synchronization Signal Block (SSB)/Channel State Information Reference Signal (CSI-RS) Index, etc.) and selection criteria, and uses the PRACH resource to send the selected random access preamble to the base station.

Msg2: random access response monitoring. The UE monitors the PDCCH in the window to receive the corresponding random access response.

(2) Connection Establishment and Connection Resume Procedure of the UE

The connection establishment and the connection resume of the UE both use the contention-based random access procedure. After the UE sends the preamble (msg1) and receives the RAR message (msg2), the first RRC uplink message is msg3 of the random access procedure, the first RRC downlink message is msg4 of the random access procedure, and the second RRC uplink message is msg5 of the random access procedure.

Figure 3:
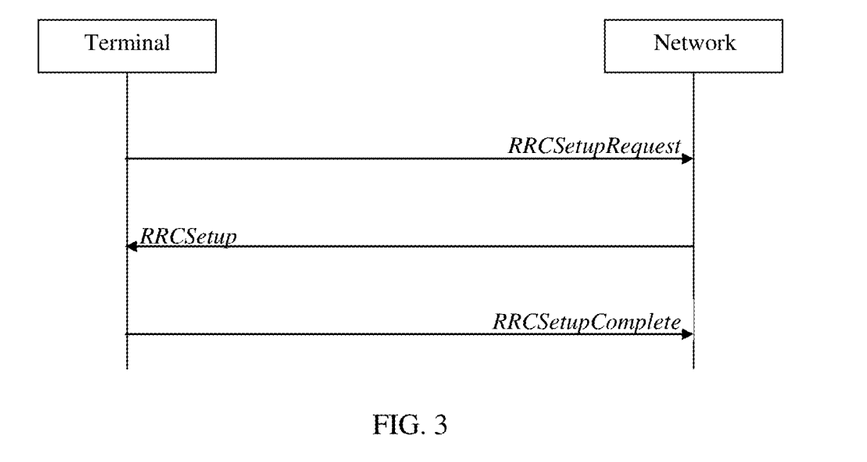
FIG. 3 is a schematic diagram of a terminal in an idle state initiating an RRC connection establishment procedure.

The UE in an idle (IDLE) state may initiate an RRC connection establishment procedure. The UE sends an RRC setup request (RRCSetupRequest) message. If the network agrees to the UE access, the network replies with an RRCSetup message. Then the UE sends an RRC setup complete (RRCSetupComplete) message. The specific process is shown in FIG. 3.

Figure 4:
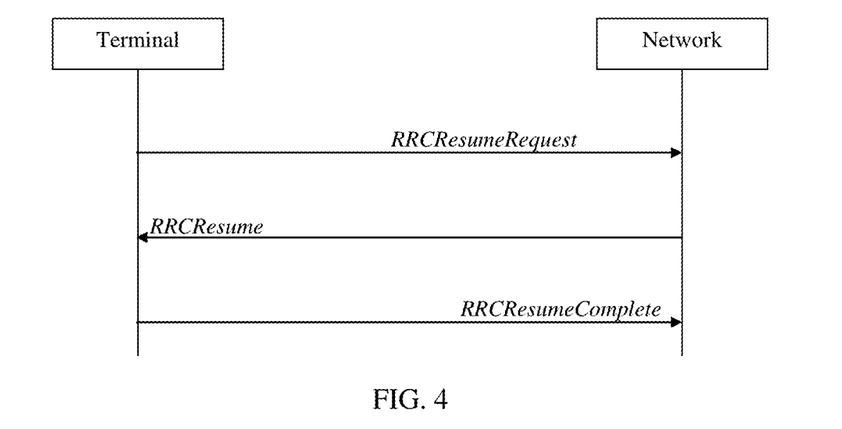
FIG. 4 is a schematic diagram of a terminal in an inactive state initiating an RRC connection resume procedure.

The UE in an inactive (INACTIVE) state may initiate an RRC connection resume procedure. The UE sends an RRC resume request (RRCResumeRequest) message:

If the network successfully obtains context of the UE from the anchor cell and agrees to the UE access, it replies with an RRC resume (RRCResume) message to notify the UE to resume the connection, and then the UE sends an RRC resume complete (RRCResumeComplete) message. The specific process is shown in FIG. 4.

Figure 5:
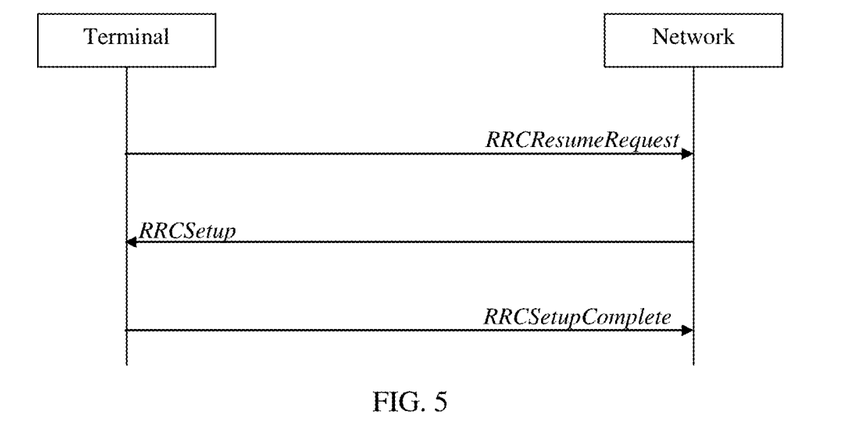
FIG. 5 is a schematic diagram of an RRC connection establishment procedure initiated by a network.

If the network fails to obtain context of the UE from the anchor cell, but still agrees to the UE access, it performs a fallback process and replies with an RRCSetup message to notify the UE to establish a new connection, and then the UE sends an RRCSetupComplete message. The specific process is shown in FIG. 5.

(3) SSB

The information block, specified by the physical layer, and used for synchronization and main information block reading. Each beam corresponds to an SSB index.

It may be used for radio resource management (Radio Resource Management, RRM) measurement.

(4) UL and SUL

Due to the frequency used by the new radio (New Radio, NR) system is relative high, the coverage area becomes smaller. To supplement this coverage, the network may configure, for uplink of the UE, two sets of parameters of uplink (Uplink, UL) and supplementary uplink (Supplementary Uplink, SUL). The SUL may use the frequency band location of the long term evolution (Long Term Evolution, LTE).

In a case that the downlink measurement quality of the UE on the UL carrier is lower than the network broadcast threshold, the SUL carrier and the related configuration are used for random access. Once started, all uplink transmissions of this random access can only be sent on the selected SUL frequency.

(5) On-Demand System Information (System Information, SI)

The system information of the NR system is sent to the UE in the IDLE/INACTIVE state by broadcasting. However, the network may only send broadcast for some necessary pieces of system information, while other pieces of system information are not sent in the broadcast unless requested by the UE.

The UE in the IDLE state or the INACTIVE state may request, through msg1 or msg3 of random access, the network to send a certain/some certain SI messages. If a manner based on msg3 (msg3 based) is used, the UE may provide index of SI message needed by the UE, in a separate RRC uplink dedicated signaling; if a manner based on msg1 (msg1 based) is used, the network side needs to broadcast in the system information in advance configuration information used for system information SI request, such as mapping relationship between SI message index and preamble, available RACH resource and correspondence between resource and SSB, etc.

After MAC layer contention resolution is successful, Msg1/msg3 based SI request both need notifying RRC.

The present disclosure provides an information reporting method, an information obtaining method, a terminal and a network device, to address the problem that the content recorded and reported in a case of RACH failure/success in the related RRC access procedure does not meet requirements of the 5G and subsequent communication systems and communication reliability of the 5G and subsequent communication systems cannot be ensured.

Figure 6:
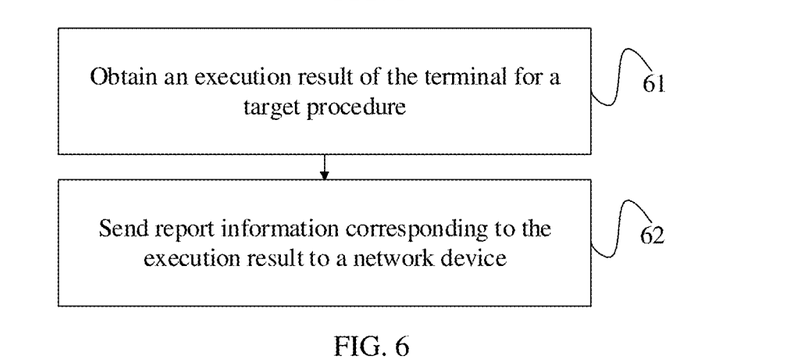
FIG. 6 is a flow chart of an information reporting method according to embodiments of the present disclosure.

As shown in FIG. 6, the information reporting method according to embodiments of the present disclosure, which is applied to a terminal, includes the following steps.

Step 61 includes: obtaining an execution result of the terminal for a target procedure.

It should be noted that the target procedure is a connection establishment procedure, a connection resume procedure, or a system information request procedure. The execution result of the corresponding target procedure is access failure or access success. For each of the above three procedures, the terminal may execute an access procedure. Therefore, the execution result corresponding to these three procedures refers to the result of random access, that is, access success or access failure.

Step 62 includes: sending report information corresponding to the execution result to a network device.

It should be noted that the report information includes at least one of: type information of the target procedure, beam related information, resource related information, cell related information, location information of the terminal, or time related information.

The following describes the specific content contained in the report information.

It should be noted that the type information of the target procedure is used to distinguish the connection establishment procedure, the connection resume procedure, and the system information request procedure.

First: Beam Related Information

It should be noted that the beam related information includes at least one of the following information.

A1. First Beam information

It should be noted that, when the execution result is the access failure, the first beam information is beam information used in a case that the terminal fails; when the execution result is the access success, the first beam information is beam information used in a case that the terminal successfully accesses. It should also be noted that, the beam information is identification information of the beam, for example, the index of the beam.

A2. Measurement information of a beam of a first cell

It should be noted that the first cell includes: a cell where the terminal initiates a random access. Further, the first cell also includes: a neighboring cell of the cell where the terminal initiates the random access.

Specifically, the NR system introduces beam-level information, and uses SSB and CSI-RS as measurement reference symbols. SSB may be used in both IDLE/INACTIVE and CONNECTED states, and the SSB index is used as the identifier of the beam-level measurement result of the terminal.

The terminal performs SSB based mobility measurement in IDLE/INACTIVE, and calculates based on the beam-level measurement result, to obtain the cell-level measurement result to use it as the input parameter of the mobility criterion of cell selection/reselection, so as to realize UE mobility in IDLE/INACTIVE.

For example, when the terminal needs to establish a connection or resume a connection, and if an access failure occurs, the terminal may record the following content:

A11. The beam information of the beam used when the terminal initiates access to the cell but fails, and the beam-level measurement result for the beam.

A12. The measurement result of the terminal in the IDLE/INACTIVE state before the failure, for the camped cell and each neighbouring cell, including RSRP and RSRQ (RSRQ value is related to type), and the possible beam-level measurement result.

After the relevant network side receives the beam-level measurement result related to the access failure, it may be used to adjust configuration parameters related to the beam, such as the quantity of SSBs, antenna position, etc.; or reported to a data collection node (TCE) for being used by the operator in big data statistics or other purposes.

Second: Resource Related Information

It should be noted that the resource related information includes at least one of the following information:

B1. A preamble and random access channel RACH resource information used by the terminal It should be noted that the preamble refers to a preamble actually used by the terminal when performing random access; the RACH resource information refers to RACH resource information actually used by the terminal.

B2. Carrier information used by the terminal

Specifically, the carrier information refers to a carrier actually used by the terminal when performing random access, which may be a UL carrier used by the terminal or an SUL carrier used by the terminal.

B3. The quantity of transmission of a preamble

B4. Indication information of whether a maximum transmission power of a preamble is reached B5. A correspondence between RACH resource information and synchronization signal block (SSB)

For example, when the terminal needs to establish a connection or resume a connection, and if access failure or access success occurs, the terminal may record one or more pieces of information of the above B1-B5. It should be noted that two sets of RACH parameters may be broadcasted in the system information of the network, which are for UL and SUL respectively. In a case that the terminal wants to establish a connection with the network side, it may choose to initiate access through UL or SUL according to the current measurement result. In a case that the downlink measurement quality of the terminal on the UL carrier is lower than the network broadcast threshold, the SUL carrier and the related configuration are used for random access. If access failure occurs, the network side may not know on which carrier the access failure behavior occurs. Therefore, the terminal needs to record the carrier information used when the access failure occurs, which helps the network side determine the cause of the access failure and adjust the parameters in the subsequent after receiving it. Once the terminal initiates a random access on a certain carrier, all uplink transmissions of this random access can only be sent on the selected uplink carrier.

In addition to reporting the carrier information, other terminal access information related to RACH (the quantity of transmissions of a preamble, the indication information of whether a maximum transmission power of the preamble is reached, RACH resource information, a correspondence between RACH resource and SSB, etc.) may be recorded and reported by the UE.

After the measurement result record is received by the relevant network side, it may be used to improve the RACH resource configuration scheme, such as preamble assignment, RACH resource configuration, etc.; or reported to the TCE for the operator to perform big data statistics and other purposes.

Third: Cell Related Information

It should be further noted that the cell related information includes at least one of the following information:

C1. A public land mobile network (PLMN) with which the terminal is registered

C2. Measurement result information of the terminal in a first state, for a currently camped cell and a neighboring cell of the currently camped cell The first state includes: an idle state and/or an inactive state.

It should be noted that, in a case that the execution result is the access failure, the measurement result information is measurement result information of the terminal in the first state before the access failure, for the currently camped cell and the neighboring cell of the currently camped cell. Further, the measurement result information may be: measurement result obtained for the last measurement (that is, the measurement which is nearest to the moment of the access failure) performed on the currently camped cell and the neighboring cell of the currently camped cell by the terminal in the idle state or inactive state before the access failure.

Specifically, in a case that the execution result is the access failure, the cell related information includes: identification information of a cell where the access failure occurs; in a case that the execution result is the access success, the cell related information includes: identification information of a cell that the terminal successfully accesses.

For example, in a case that the terminal fails to access, the terminal needs to record the identity of the cell (such as cell identity) where the access failure occurs and/or the registered PLMN, which are used for the receiving network node (i.e., the network device) to send the failure record content after parsing, to the node where the failure occurs, and determine the PLMN used in the case of access failure at the network node where the failure occurs.

Fourth: Location Information of the Terminal

It should be noted that the location information of the terminal refers to geographic location information of the terminal, such as downlink observed time difference of arrival (Observed Time Difference Of Arrival, OTDOA) positioning result, horizontal and vertical positioning result, or global navigation satellite system (Global Navigation Satellite System, GNSS) positioning result, etc., used for the node, at which the access failure occurs, to adjust parameters related to the location information, such as the quantity of SSBs, antenna position/antenna inclination, or transmission power, or used for the data collection node/operator in big data statistics, etc.

Fifth: Time Related Information

It should be noted that the time related information is mainly content recorded in a case that the execution result is the access failure. The time related information includes: a time interval between a time when the access failure occurs and a time when the failure is reported, which is mainly used to assist the receiving node to find the failed node and determine validity of data.

It should also be noted that in a case that the target procedure is the system information request procedure, the report information also includes at least one of the following information:

D1. Random access type information

It should be noted that the random access type information refers to that it is a random access for a system information request based on message 1 (Msg1) or a random access for a system information request based on message 3 (Msg3).

D2. Acquisition latency information of system information

For example, in the IDLE/INACTIVE state, in addition to initiating random access for establishing a connection, the terminal may also request system information through initiating random access. If it is a manner based on message 1 (msg1 based), the network side needs to broadcast in system information in advance configuration information used for system information SI request, such as mapping relationship between SI message index and preamble, and the available RACH resource information, or correspondence between RACH resource and SSB, etc.

If success indication is not received from the MAC layer after triggering random access request for SI request, the terminal may consider that the SI request is failed or the access is failed. The cause for the failure may be: msg1 not being successfully sent, the network side not agreeing to the SI sending request, or unsuccessful reception of message 2 (msg2) by the terminal. In order to distinguish these types of failure causes and optimize for the failure problem, the terminal may record: whether the initiation of the relevant RACH is for the SI request, and access related information, such as the quantity of transmissions of preamble, indication information of whether a maximum transmission power of preamble is reached, RACH resource information, or correspondence between RACH resource and SSB, etc.

If success indication is received from the MAC layer after triggering random access request for SI request, the terminal may consider that the SI request is successful or the access is successful, and subsequently wait for the network to send the SI message required by the terminal at the corresponding location. In order to optimize the system information acquisition algorithm scheme or for other purposes, for the entire SI acquisition process, the terminal may record acquisition latency information of the SI, etc., for example, it may be used at the base station side to calculate average acquisition latency of the SI, and adjust system information cycle and on-demand manner, etc.

It should be further noted that in the above report information, the newly added information for the NR system includes:

D11. Beam information used when failure occurs or beam information used when the terminal successfully accesses D12. Measurement information of beams of a cell where the terminal initiates a random access and a neighboring cell of the cell where the terminal initiates the random access D13. A preamble and RACH resource information used by the terminal D14. A correspondence between RACH resource information and synchronization signal block SSB D15. Carrier information used by the terminal D16. Parameter information used for system information request, including random access type information and acquisition latency information of system information The information inherited from the LTE includes:

D21. Identification information of a cell where the access failure occurs and/or a registered PLMN D22. Measurement result information of the terminal in a first state before the access failure, for a currently camped cell and a neighboring cell of the currently camped cell D23. The quantity of transmission of a preamble D24. Indication information of whether a maximum transmission power of a preamble is reached D25. Location information of the terminal D26. A time interval between a time when the access failure occurs and a time when the failure is reported In a case of the access success or the access failure, the terminal may select one or more items from D11-D16 and D21-D26 to form the report information and send it to the network device.

It should also be noted that for content record of the access success, the terminal may directly report it to the network device in the connected state; for content record of the access failure, or content record of SI request (for on-demand SI acquisition, it is not needed to enter the connected state), the terminal may send an available indication to the network side in the procedure of connection establishment/connection reestablishment/connection resume/switching, etc., and may send it to the network side after the network notify the terminal to report it. The record is a record for failure of the terminal for the access node B, the report information recorded by the terminal may be received by the node A on the network side, and may not be received by the network-side node B where the failure occurs. In view of this situation, there are two subsequent processing methods.

First method: if configured information recorded by the terminal for access failure/access success cannot be used for configuration or resource adjustment on the base station side, the node A on the network side does not need to parse the report information of the terminal, and the node A directly reports it to the TCE, for the operator to perform big data statistics and judgment in decision making.

Second method: if configured report information recorded by the terminal for access failure/access success can be used by the network-side node B where the terminal fails, such as being used for adjustment of configuration parameters of the base station side, adjustment of resource scheduling, and adjustment of beam information, the node A that receives the report information may preliminarily parse the network-side node B where the access problem of the terminal occurs and which is indicated in the report information, and send the recorded content to the node B where the access failure of the terminal occurs. The node B may use the recorded content to perform optimization related to the base station, and/or report it to the TCE for the operator to perform big data statistics and judgment in decision making.

In the embodiments of the present disclosure, the report information is sent according to the execution result of the connection establishment procedure, the connection resume procedure or the system information request procedure, thereby improving the communication process of the 5G and subsequent communication systems and ensuring the reliability of network communication.

Figure 7:
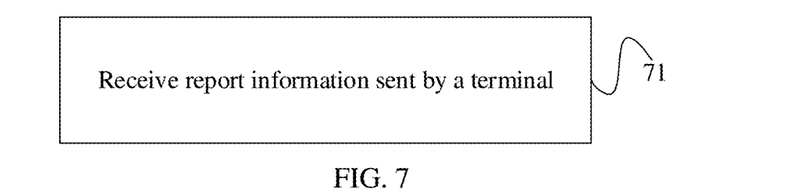
FIG. 7 is a flow chart of an information obtaining method according to embodiments of the present disclosure.

As shown in FIG. 7, embodiments of the present disclosure also provide an information obtaining method, which is applied to a network device and includes the following step.

Step 71 includes: receiving report information sent by a terminal.

The report information corresponds to an execution result of the terminal for a target procedure.

The target procedure is a connection establishment procedure, a connection resume procedure, or a system information request procedure.

The report information includes at least one of: type information of the target procedure, beam related information, resource related information, cell related information, location information of the terminal, or time related information.

The execution result is access success or access failure.

Specifically, the beam related information includes at least one of the following information:
first beam information, or,
measurement information of a beam of a first cell.

The first cell includes: a cell where the terminal initiates a random access.

Further, the first cell further includes: a neighboring cell of the cell where the terminal initiates the random access.

Further, in a case that the execution result is the access failure, the first beam information is beam information used when the terminal fails; and in a case that the execution result is the access success, the first beam information is beam information used when the terminal successfully accesses.

Specifically, the resource related information includes at least one of the following information:
a preamble and random access channel (RACH) resource information that are used by the terminal;
carrier information used by the terminal;
the quantity of transmissions of a preamble;
indication information of whether a maximum transmission power of a preamble is reached; or,
a correspondence between RACH resource information and synchronization signal block (SSB).

Specifically, the cell related information includes at least one of the following information:
a registered public land mobile network of the terminal; or,
measurement result information of the terminal in a first state, where the measurement result information is about a cell on which the terminal currently camps and a neighboring cell of the cell on which the terminal currently camps.

The first state includes: an idle state and/or an inactive state.

Further, in a case that the execution result is the access failure, the measurement result information is measurement result information of the terminal in the first state before the access failure, about the cell on which the terminal currently camps and the neighbouring cell of the cell on which the terminal currently camps.

Specifically, in a case that the execution result is the access failure, the cell related information includes: identification information of a cell where the access failure occurs.

Specifically, in a case that the execution result is the access success, the cell related information includes: identification information of a cell where successful access of the terminal occurs.

Specifically, in a case that the execution result is the access failure, the time related information includes: a time interval between a time when the access failure occurs and a failure reporting time.

Specifically, in a case that the target procedure is the system information request procedure, the report information further includes at least one of the following information:
random access type information, or,
acquisition latency information of system information.

Further, after the receiving the report information sent by the terminal, the method further includes:
sending the report information to a data collection node.

Further, after the receiving the report information sent by the terminal, the method further includes:
parsing a network node where an access problem of the terminal occurs, where the network node is indicated in the report information; and
sending the report information to the network node.

In the above embodiments, all the descriptions about the network device are applicable to the embodiments of the information obtaining method applied to the network device, and the same technical effects can also be achieved.

Figure 8:
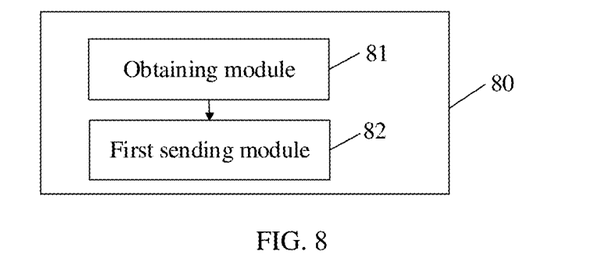
FIG. 8 is a schematic diagram of modules of a terminal according to embodiments of the present disclosure.

As shown in FIG. 8, embodiments of the present disclosure provide a terminal 80, including:

a obtaining module 81, configured to obtain an execution result of the terminal for a target procedure; and a first sending module 82, configured to send report information corresponding to the execution result to a network device.

The target procedure is a connection establishment procedure, a connection resume procedure, or a system information request procedure.

The report information includes at least one of: type information of the target procedure, beam related information, resource related information, cell related information, location information of the terminal, or time related information.

The execution result is access success or access failure.

Specifically, the beam related information includes at least one of the following information:

first beam information, or, measurement information of a beam of a first cell; where the first cell includes: a cell where the terminal initiates a random access.

The first cell includes: a cell where the terminal initiates a random access.

Further, the first cell further includes: a neighboring cell of the cell where the terminal initiates the random access.

Further, in a case that the execution result is the access failure, the first beam information is beam information used when the terminal fails; and in a case that the execution result is the access success, the first beam information is beam information used when the terminal successfully accesses.

Specifically, the resource related information includes at least one of the following information:

a preamble and random access channel (RACH) resource information that are used by the terminal;

carrier information used by the terminal;

the quantity of transmissions of a preamble;

indication information of whether a maximum transmission power of a preamble is reached; or, a correspondence between RACH resource information and synchronization signal block (SSB).

Specifically, the cell related information includes at least one of the following information:

a registered public land mobile network of the terminal; or, measurement result information of the terminal in a first state, where the measurement result information is about a cell on which the terminal currently camps and a neighboring cell of the cell on which the terminal currently camps.

The first state includes: an idle state and/or an inactive state.

Further, in a case that the execution result is the access failure, the measurement result information is measurement result information of the terminal in the first state before the access failure, about the cell on which the terminal currently camps and the neighbouring cell of the cell on which the terminal currently camps.

Specifically, in a case that the execution result is the access failure, the cell related information includes: identification information of a cell where the access failure occurs.

Specifically, in a case that the execution result is the access success, the cell related information includes: identification information of a cell where successful access of the terminal occurs.

Specifically, in a case that the execution result is the access failure, the time related information includes: a time interval between a time when the access failure occurs and a failure reporting time.

Specifically, in a case that the target procedure is the system information request procedure, the report information further includes at least one of the following information:

random access type information, or, acquisition latency information of system information.

It should be noted that the terminal embodiment is a terminal that is in a one-to-one correspondence with the above method embodiments, and all implementation manners in the above method embodiments are applicable to the embodiments of the terminal, and the same technical effects can also be achieved.

Figure 9:
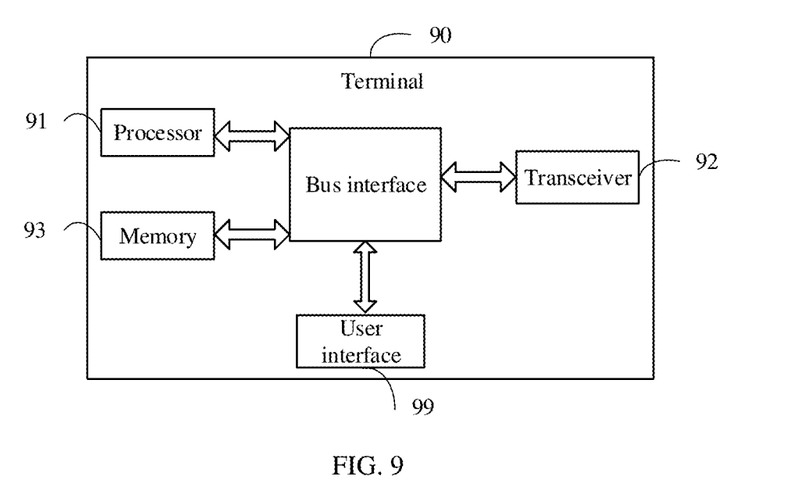
FIG. 9 is a structural diagram of a terminal according to embodiments of the present disclosure.

As shown in FIG. 9, embodiments of the present disclosure also provide a terminal 90, including a processor 91, a transceiver 92, a memory 93, and a computer program that is stored on the memory 93 and executable on the processor 91. The transceiver 92 is connected to the processor 91 and the memory 93 via a bus interface. The processor 91 is configured to read the program in the memory to execute the following process:

obtaining an execution result of the terminal for a target procedure; and sending report information corresponding to the execution result to a network device via the transceiver 92.

The target procedure is a connection establishment procedure, a connection resume procedure, or a system information request procedure.

The report information includes at least one of: type information of the target procedure, beam related information, resource related information, cell related information, location information of the terminal, or time related information.

The execution result is access success or access failure.

It should be noted that, in FIG. 9, a bus architecture may include any quantity of interconnected buses and bridges. Specifically, various circuits of one or more processors represented by the processor 91 and a memory represented by the memory 93 are coupled together. The bus architecture may also couple various other circuits such as peripheral devices, voltage regulators, power management circuits, etc., which are known in the art, and thus no further description thereof will be provided herein. The bus interface provides an interface. The transceiver 92 may be multiple elements, including a transmitter and a transceiver, configured to provide a unit for communicating with various other devices on a transmission medium. For different terminals, the user interface 99 may be an interface capable of connecting externally or internally with a required device. The connected device includes but not limited to a keypad, a display, a speaker, a microphone, a joystick, and the like. The processor 91 is responsible for managing the bus architecture and common processing, and the memory 93 may store data used by the processor 91 when performing operations.

Specifically, the beam related information includes at least one of the following information:

first beam information, or, measurement information of a beam of a first cell.

The first cell includes: a cell where the terminal initiates a random access.

Further, the first cell further includes: a neighboring cell of the cell where the terminal initiates the random access.

Further, in a case that the execution result is the access failure, the first beam information is beam information used when the terminal fails; and in a case that the execution result is the access success, the first beam information is beam information used when the terminal successfully accesses.

Specifically, the resource related information includes at least one of the following information:
  a preamble and random access channel (RACH) resource information that are used by the terminal;
  carrier information used by the terminal;
  the quantity of transmissions of a preamble;
  indication information of whether a maximum transmission power of a preamble is reached; or,
  a correspondence between RACH resource information and synchronization signal block (SSB).

Specifically, the cell related information includes at least one of the following information:
  a registered public land mobile network of the terminal; or,
  measurement result information of the terminal in a first state, where the measurement result information is about a cell on which the terminal currently camps and a neighboring cell of the cell on which the terminal currently camps.

The first state includes: an idle state and/or an inactive state.

Further, in a case that the execution result is the access failure, the measurement result information is measurement result information of the terminal in the first state before the access failure, about the cell on which the terminal currently camps and the neighbouring cell of the cell on which the terminal currently camps.

Specifically, in a case that the execution result is the access failure, the cell related information includes: identification information of a cell where the access failure occurs.

Specifically, in a case that the execution result is the access success, the cell related information includes: identification information of a cell where successful access of the terminal occurs.

Specifically, in a case that the execution result is the access failure, the time related information includes: a time interval between a time when the access failure occurs and a failure reporting time.

Specifically, in a case that the target procedure is the system information request procedure, the report information further includes at least one of the following information:
  random access type information, or,
  acquisition latency information of system information.

The terminal of the embodiments of the present disclosure sends the report information according to the execution result of the connection establishment procedure, the connection resume procedure or the system information request procedure, thereby improving the communication procedure of the 5G and subsequent communication systems and ensuring the reliability of network communication.

Embodiments of the present disclosure also provide a computer readable storage medium on which a computer program is stored, where the computer program implements the steps of the information reporting method applied to the terminal when the computer program is executed by the processor.

Figure 10:
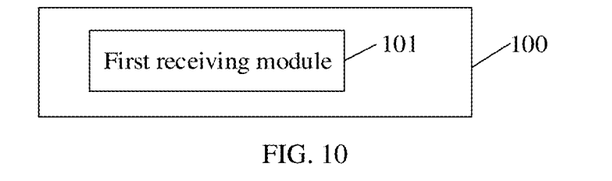
FIG. 10 is a schematic diagram of modules of a network device according to embodiments of the present disclosure.

As shown in FIG. 10, embodiments of the present disclosure provide a network device 100, including:
  a first receiving module 101, configured to receive report information sent by a terminal.

The report information corresponds to an execution result of the terminal for a target procedure.

The target procedure is a connection establishment procedure, a connection resume procedure, or a system information request procedure.

The report information includes at least one of: type information of the target procedure, beam related information, resource related information, cell related information, location information of the terminal, or time related information.

The execution result is access success or access failure.

Specifically, the beam related information includes at least one of the following information:
  first beam information, or,
  measurement information of a beam of a first cell.

The first cell includes: a cell where the terminal initiates a random access.

Further, the first cell further includes: a neighboring cell of the cell where the terminal initiates the random access.

Further, in a case that the execution result is the access failure, the first beam information is beam information used when the terminal fails; and in a case that the execution result is the access success, the first beam information is beam information used when the terminal successfully accesses.

Specifically, the resource related information includes at least one of the following information:
  a preamble and random access channel (RACH) resource information that are used by the terminal;
  carrier information used by the terminal;
  the quantity of transmissions of a preamble;
  indication information of whether a maximum transmission power of a preamble is reached; or,
  a correspondence between RACH resource information and synchronization signal block (SSB).

Specifically, the cell related information includes at least one of the following information:
  a registered public land mobile network of the terminal; or,
  measurement result information of the terminal in a first state, where the measurement result information is about a cell on which the terminal currently camps and a neighboring cell of the cell on which the terminal currently camps.

The first state includes: an idle state and/or an inactive state.

Further, in a case that the execution result is the access failure, the measurement result information is measurement result information of the terminal in the first state before the access failure, about the cell on which the terminal currently camps and the neighbouring cell of the cell on which the terminal currently camps.

Specifically, in a case that the execution result is the access failure, the cell related information includes: identification information of a cell where the access failure occurs.

Specifically, in a case that the execution result is the access success, the cell related information includes: identification information of a cell where successful access of the terminal occurs.

Specifically, in a case that the execution result is the access failure, the time related information includes: a time interval between a time when the access failure occurs and a failure reporting time.

Specifically, in a case that the target procedure is the system information request procedure, the report information further includes at least one of the following information:
 random access type information, or,
 acquisition latency information of system information.
Optionally, the terminal further includes:
 a second sending module, configured to send the report information to a data collection node.
Optionally, the terminal further includes:
 a parsing module, configured to parse a network node where an access problem of the terminal occurs, where the network node is indicated in the report information; and
 a third sending module, configured to send the report information to the network node.

It should be noted that the network device embodiment is a network device that is in a one-to-one correspondence with the above method embodiments, and all implementation manners in the above method embodiments are applicable to the network device embodiments, and the same technical effects can also be achieved.

Figure 11:
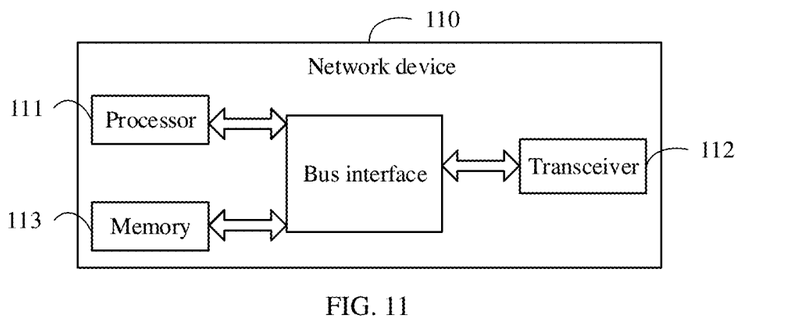
FIG. 11 is a structural diagram of a network device according to embodiments of the present disclosure.

As shown in FIG. 11, embodiments of the present disclosure also provide a network device 110, including a processor 111, a transceiver 112, a memory 113, and a computer program stored on the memory 113 and executable on the processor 111. The transceiver 112 is connected to the processor 111 and the memory 113 via a bus interface. The processor 111 is configured to read the program in the memory to execute the following process:
 receiving, via the transceiver 112, report information sent by a terminal.

The report information corresponds to an execution result of the terminal for a target procedure.

The target procedure is a connection establishment procedure, a connection resume procedure, or a system information request procedure.

The report information includes at least one of: type information of the target procedure, beam related information, resource related information, cell related information, location information of the terminal, or time related information.

The execution result is access success or access failure.

It should be noted that in FIG. 11, a bus architecture may include any quantity of interconnected buses and bridges. Specifically, various circuits of one or more processors represented by the processor 111 and a memory represented by the memory 113 are coupled together. The bus architecture may also couple various other circuits such as peripheral devices, voltage regulators, power management circuits, etc., which are known in the art, and thus no further description thereof will be provided herein. The bus interface provides an interface. The transceiver 112 may be multiple elements, including a transmitter and a transceiver, configured to provide a unit for communicating with various other devices on a transmission medium. For different terminals, the processor 111 is responsible for managing the bus architecture and common processing, and the memory 113 may store data used by the processor 111 when performing operations.

Specifically, the beam related information includes at least one of the following information:
 first beam information, or,
 measurement information of a beam of a first cell.

The first cell includes: a cell where the terminal initiates a random access.

Further, the first cell further includes: a neighboring cell of the cell where the terminal initiates the random access.

Further, in a case that the execution result is the access failure, the first beam information is beam information used when the terminal fails; and in a case that the execution result is the access success, the first beam information is beam information used when the terminal successfully accesses.

Specifically, the resource related information includes at least one of the following information:
 a preamble and random access channel (RACH) resource information that are used by the terminal;
 carrier information used by the terminal;
 the quantity of transmissions of a preamble;
 indication information of whether a maximum transmission power of a preamble is reached; or,
 a correspondence between RACH resource information and synchronization signal block (SSB).

Specifically, the cell related information includes at least one of the following information:
 a registered public land mobile network of the terminal; or,
 measurement result information of the terminal in a first state, where the measurement result information is about a cell on which the terminal currently camps and a neighboring cell of the cell on which the terminal currently camps.

The first state includes: an idle state and/or an inactive state.

Further, in a case that the execution result is the access failure, the measurement result information is measurement result information of the terminal in the first state before the access failure, about the cell on which the terminal currently camps and the neighbouring cell of the cell on which the terminal currently camps.

Specifically, in a case that the execution result is the access failure, the cell related information includes: identification information of a cell where the access failure occurs.

Specifically, in a case that the execution result is the access success, the cell related information includes: identification information of a cell where successful access of the terminal occurs.

Specifically, in a case that the execution result is the access failure, the time related information includes: a time interval between a time when the access failure occurs and a failure reporting time.

Specifically, in a case that the target procedure is the system information request procedure, the report information further includes at least one of the following information:
 random access type information, or,
 acquisition latency information of system information.

Optionally, the processor implements the following step when executing the computer program:
 sending the report information to a data collection node.

Optionally, the processor implements the following steps when executing the computer program:
 parsing a network node where an access problem of the terminal occurs, where the network node is indicated in the report information; and
 sending the report information to the network node.

The network device may be a base station (Base Transceiver Station, BTS) in Global System of Mobile communication (GSM) or Code Division Multiple Access (CDMA), or it may be a base station (NodeB, NB) in Wideband Code Division Multiple Access (WCDMA), or it may be an evolved base station (Evolutional Node B, eNB or eNodeB)

in LTE, or a relay station or an access point, or a base station in the 5G network, etc., which are not limited herein.

Embodiments of the present disclosure also provide a computer readable storage medium on which a computer program is stored, where the computer program is executed by a processor to implement the steps of the information obtaining method applied to the network device.

It can be understood that the embodiments described in the present disclosure may be implemented by hardware, software, firmware, middleware, microcode, or a combination thereof. For hardware implementation, the processing unit may be implemented in one or more application specific integrated circuits (Application Specific Integrated Circuits, ASIC), digital signal processors (Digital Signal Processing, DSP), digital signal processing devices (DSP Device, DSPD), programmable logic devices (Programmable Logic Device, PLD), field-programmable gate arrays (Field-Programmable Gate Array, FPGA), general-purpose processors, controllers, microcontrollers, microprocessors, others electronic units for performing the functions described in the present disclosure, or a combination thereof.

For software implementation, the technologies described in the embodiments of the present disclosure may be implemented by modules (such as processes, functions, etc.) that perform the functions described in the embodiments of the present disclosure. Software codes may be stored in a memory and executed by a processor. The memory may be implemented in the processor or external to the processor.

In addition, functional units in various embodiments of the present disclosure may be integrated into one processing unit, or may be physically independent, or two or more units may be integrated into one unit.

If the function is implemented in the form of a software functional unit, and sold or used as a standalone product, it may be stored in a computer readable storage medium. Based on this understanding, essence of the technical solution of the present disclosure, or the part contributing to the related technologies, or part of the technical solution, may be embodied in the form of a software product. The computer software product is stored in a storage medium, and the software product includes a number of instructions to enable a computer device (which may be a personal computer, a server, or a network device, etc.) to perform all or part of the steps of method described in the various embodiments of the present disclosure. The storage medium includes a USB flash disk, a mobile hard disk, a read-only memory (ROM), a random access memory (RAM), a magnetic disk, an optical disk, and other medium which can store program code.

Optional implementations of the present disclosure are described in the above. It should be noted that, for those skilled in the art, various improvements and modifications may be made without departing from the principle of the present disclosure, and these improvements and modifications fall within the protection scope of the present disclosure.

What is claimed is:

1. An information reporting method, applied to a terminal, comprising:
    obtaining an execution result of the terminal for a target procedure, wherein the execution result is a result of random access; and
    sending report information corresponding to the execution result to a network device;
    wherein the target procedure is a system information request procedure;
    the execution result is access success or access failure;
    wherein the report information comprises random access type information;
    wherein the random access type information comprises a random access for a system information request based on message 1 (Msg1) or a random access for a system information request based on message 3 (Msg3);
    wherein the report information further comprises whether the initiation of random access is for the system information request procedure, a quantity of transmissions of preamble, indication information of whether a maximum transmission power of preamble is reached, correspondence between RACH resource and SSB;
    the report information further comprises a carrier actually used by the terminal when performing random access, the carrier comprises a UL carrier or an SUL carrier;
    the report information further comprises the result of a measurement in an inactive state or an idle state nearest to the moment of the access failure; and a time interval between a time when the access failure occurs and a failure reporting time;
    wherein if success indication is not received from a MAC layer after the random access for system information request, the execution result is access failure, if success indication is received from a MAC layer after the random access, the execution result is access success; a cause for the system information request failure includes: msg1 not being successfully sent, the network device not agreeing to the SI sending request, or unsuccessful reception of message 2 (msg2) by the terminal; the report information is used to distinguish the cause for the system information request failure;
    the terminal sends an available indication to the network device during system information request procedure, and sends the report information to the network device after the network device notifies the terminal to report.

2. The information reporting method according to claim 1, wherein the report information further comprises at least one of: type information of the target procedure, resource related information, cell related information, location information of the terminal, or time related information.

3. The information reporting method according to claim 2, wherein the cell related information comprises:
    a registered public land mobile network of the terminal.

4. The information reporting method according to claim 2, wherein:
    in a case that the execution result is the access failure, the cell related information comprises: identification information of a cell where the access failure occurs; or,
    in a case that the execution result is the access success, the cell related information comprises: identification information of a cell where successful access of the terminal occurs.

5. The information reporting method according to claim 1, wherein the report information further comprises acquisition latency information of system information.

6. The information reporting method according to claim 1, wherein the report information further comprises beam related information;
    the beam related information comprises at least one of: first beam information, or, measurement information of a beam of a first cell, wherein the first cell comprises: a cell where the terminal initiates a random access and a neighboring cell of the cell where the terminal initiates the random access;
    the first beam information is beam information for target procedure execution; wherein in a case that the execution result is the access failure, the first beam information is beam information used when the terminal fails; and in a case that the execution result is the access success, the first beam information is beam information used when the terminal successfully accesses.

7. An information obtaining method, applied to a network device, comprising: receiving report information sent by a terminal;

wherein the report information corresponds to an execution result of the terminal for a target procedure, wherein the execution result is a result of random access; the target procedure is a system information request procedure; the execution result is access success or access failure;

wherein the report information comprises random access type information;

wherein the random access type information comprises a random access for a system information request based on message 1 (Msg1) or a random access for a system information request based on message 3 (Msg3);

wherein the report information further comprises whether the initiation of random access is for the system information request procedure, a quantity of transmissions of preamble, indication information of whether a maximum transmission power of preamble is reached, correspondence between RACH resource and SSB;

the report information further comprises a carrier actually used by the terminal when performing random access, the carrier comprises a UL carrier or an SUL carrier;

the report information further comprises the result of a measurement in an inactive state or an idle state nearest to the moment of the access failure; and a time interval between a time when the access failure occurs and a failure reporting time;

wherein if success indication is not received from a MAC layer after the random access for system information request, the execution result is access failure, if success indication is received from a MAC layer after the random access, the execution result is access success; a cause for the system information request failure includes: msg1 not being successfully sent, the network device not agreeing to the SI sending request, or unsuccessful reception of message 2 (msg2) by the terminal; the report information is used to distinguish the cause for the system information request failure;

the terminal sends an available indication to the network device during system information request procedure, and sends the report information to the network device after the network device notifies the terminal to report.

8. The information obtaining method according to claim 7, wherein the report information further comprises at least one of: type information of the target procedure, resource related information, cell related information, location information of the terminal, or time related information.

9. The information obtaining method according to claim 8, wherein the cell related information comprises;

a registered public land mobile network of the terminal.

10. The information obtaining method according to claim 8, wherein:

in a case that the execution result is the access failure, the cell related information comprises: identification information of a cell where the access failure occurs; or, in a case that the execution result is the access success, the cell related information comprises: identification information of a cell where successful access of the terminal occurs.

11. The information obtaining method according to claim 7, wherein the report information further comprises acquisition latency information of system information.

12. The information obtaining method according to claim 7, wherein the report information further comprises beam related information;

the beam related information comprises at least one of: first beam information, or, measurement information of a beam of a first cell, wherein the first cell comprises: a cell where the terminal initiates a random access and a neighboring cell of the cell where the terminal initiates the random access;

the first beam information is beam information for target procedure execution; wherein in a case that the execution result is the access failure, the first beam information is beam information used when the terminal fails; and in a case that the execution result is the access success, the first beam information is beam information used when the terminal successfully accesses.

13. A network device, comprising a memory, a processor, and a program stored on the memory and executable on the processor, wherein the processor implements the step of the information obtaining method according to claim 7 when executing the program.

14. A terminal, comprising a memory, a processor, and a program stored on the memory and executable on the processor, wherein the processor implements the following steps when executing the program:

obtaining an execution result of the terminal for a target procedure, wherein the execution result is a result of random access; and sending report information corresponding to the execution result to a network device;

wherein the target procedure is a system information request procedure; the execution result is access success or access failure;

wherein the report information comprises random access type information;

wherein the random access type information comprises a random access for a system information request based on message 1 (Msg1) or a random access for a system information request based on message 3 (Msg3);

wherein the report information further comprises whether the initiation of random access is for the system information request procedure, a quantity of transmissions of preamble, indication information of whether a maximum transmission power of preamble is reached, correspondence between RACH resource and SSB;

the report information further comprises a carrier actually used by the terminal when performing random access, the carrier comprises a UL carrier or an SUL carrier;

the report information further comprises the result of a measurement in an inactive state or an idle state nearest to the moment of the access failure; and a time interval between a time when the access failure occurs and a failure reporting time;

wherein if success indication is not received from a MAC layer after the random access for system information request, the execution result is access failure, if success indication is received from a MAC layer after the random access, the execution result is access success; a cause for the system information request failure includes: msg1 not being successfully sent, the network device not agreeing to the SI sending request, or unsuccessful reception of message 2 (msg2) by the terminal; the report information is used to distinguish the cause for the system information request failure;

the terminal sends an available indication to the network device during system information request procedure, and sends the report information to the network device after the network device notifies the terminal to report.

15. The terminal according to claim 14, wherein the report information further comprises at least one of: type information of the target procedure, resource related information, cell related information, location information of the terminal, or time related information.

16. The terminal according to claim 15, wherein the cell related information comprises:

a registered public land mobile network of the terminal.

17. The terminal according to claim 15, wherein:

in a case that the execution result is the access failure, the cell related information comprises: identification information of a cell where the access failure occurs; or, in a case that the execution result is the access success, the cell related information comprises: identification information of a cell where successful access of the terminal occurs.

18. The terminal according to claim 14, wherein the report information further comprises acquisition latency information of system information.

19. The terminal according to claim 14, wherein the report information further comprises beam related information;

the beam related information comprises at least one of: first beam information, or, measurement information of a beam of a first cell, wherein the first cell comprises: a cell where the terminal initiates a random access and a neighboring cell of the cell where the terminal initiates the random access;

the first beam information is beam information for target procedure execution; wherein in a case that the execution result is the access failure, the first beam information is beam information used when the terminal fails; and in a case that the execution result is the access success, the first beam information is beam information used when the terminal successfully accesses.

* * * * *